(12) United States Patent
Lange

(10) Patent No.: US 7,690,616 B2
(45) Date of Patent: Apr. 6, 2010

(54) MOUNTING SYSTEM FOR ENCLOSURE

(75) Inventor: Timothy Gordon Lange, Champlin, MN (US)

(73) Assignee: Hoffman Enclosures, Inc., Anoka, MN (US)

(*) Notice: Subject to any disclaimer, the term of this patent is extended or adjusted under 35 U.S.C. 154(b) by 252 days.

(21) Appl. No.: 11/138,071

(22) Filed: May 26, 2005

(65) Prior Publication Data

US 2006/0289718 A1  Dec. 28, 2006

(51) Int. Cl.
B65D 63/00 (2006.01)
(52) U.S. Cl. .................. 248/499; 248/500; 248/906
(58) Field of Classification Search ............... 248/906, 248/499, 500, 501, 506
See application file for complete search history.

(56) References Cited

U.S. PATENT DOCUMENTS

| 480,790 | A | | 8/1892 | Tangney | |
|---|---|---|---|---|---|
| 481,044 | A | | 8/1892 | Mottinger | |
| 537,229 | A | | 4/1895 | Pfleghar | |
| 918,021 | A | * | 4/1909 | Donovan | 248/60 |
| 1,261,036 | A | * | 4/1918 | Kerns | 24/27 |
| D165,982 | S | | 2/1952 | Kennedy | |
| 3,729,778 | A | * | 5/1973 | McGrath | 248/117.7 |
| D235,415 | S | | 6/1975 | Martini | |
| 4,309,019 | A | * | 1/1982 | Bloom | 248/610 |
| 4,338,699 | A | | 7/1982 | Rock | |
| 4,640,642 | A | | 2/1987 | Magid et al. | |
| 4,716,925 | A | * | 1/1988 | Prather | 137/360 |
| 4,796,844 | A | * | 1/1989 | Barker | 248/222.51 |
| 5,647,182 | A | | 7/1997 | Rutherford | |
| 5,715,572 | A | | 2/1998 | Steinberg | |
| 5,943,739 | A | | 8/1999 | Vandergriff | |
| 6,125,881 | A | * | 10/2000 | Hobbs et al. | 137/360 |
| D433,918 | S | | 11/2000 | Bradley et al. | |
| 6,202,977 | B1 | * | 3/2001 | Chapman | 248/505 |
| D471,425 | S | | 3/2003 | Zeilinger | |
| 6,603,660 | B1 | * | 8/2003 | Ehn et al. | 361/694 |
| 6,648,544 | B2 | | 11/2003 | Liu | |
| D507,170 | S | | 7/2005 | Franchini | |
| D512,897 | S | | 12/2005 | Franchini | |
| 6,988,697 | B2 | * | 1/2006 | Ware et al. | 248/218.4 |
| 7,168,136 | B2 | | 1/2007 | Gan | |
| 7,203,995 | B2 | | 4/2007 | Hsu et al. | |
| 2005/0251962 | A1 | | 11/2005 | De Mello et al. | |

FOREIGN PATENT DOCUMENTS

| GB | 2017220 | 2/1992 |
|---|---|---|
| GB | 2017221 | 2/1992 |
| GB | 2017222 | 2/1992 |
| GB | 2017223 | 2/1992 |

(Continued)

OTHER PUBLICATIONS

"U.S. Appl. No. 29/248,631, Notice of Allowance Mailed Nov. 20, 2007", 13 pgs.

*Primary Examiner*—Amy J Sterling
(74) *Attorney, Agent, or Firm*—Greenberg Traurig LLP

(57) ABSTRACT

An apparatus includes an enclosure mountable to a wall, a strap coupled to an outer surface of the enclosure, and a holder mounted to the wall. The holder tautly pulls the strap toward the wall to hold the enclosure against the wall.

8 Claims, 4 Drawing Sheets

FOREIGN PATENT DOCUMENTS

| | | |
|---|---|---|
| GB | 2017224 | 2/1992 |
| GB | 2017225 | 2/1992 |
| GB | 2049925 | 1/1996 |
| GB | 2096160 | 10/2000 |
| GB | 2099422 | 2/2001 |
| GB | 2099423 | 2/2001 |

* cited by examiner

MOUNTING SYSTEM FOR ENCLOSURE

FIELD OF THE INVENTION

This invention relates to the field of enclosures, and more specifically to an electrical enclosure.

BACKGROUND

Electrical enclosures can be used to house assorted electrical equipment. The enclosure protects the electrical equipment from the environment and helps prevent access to the equipment. Sometimes it is desirable to mount the enclosure flush against a wall. However, it can be difficult to mount the enclosure against the wall without boring holes through parts of the enclosure, which can then lead to infiltration.

SUMMARY

A strap is coupled to an outer surface of an enclosure and a holder is mounted to a wall. The holder is configured to tautly pull the strap toward the wall to hold the enclosure against the wall.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
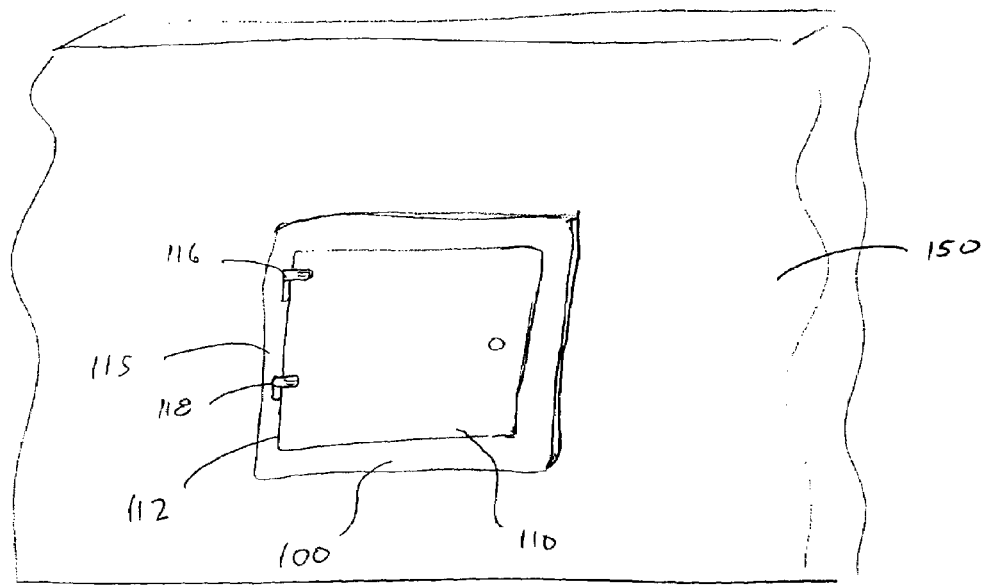
FIG. 1 shows a perspective view of an enclosure, mounted to a wall, in accordance with one embodiment.

FIG. 1 shows a perspective view of an enclosure 100 according to one embodiment. Enclosure 100 includes an enclosure body or housing 110 having a door 112. Other embodiments can utilize multiple doors. Enclosure 100 is for holding electrical equipment, for example. Door 112 is attached to housing 110 by hinges 116 and 118, respectively. Hinges 116, 118 can include a lift-off hinge and further details will be discussed below.

Enclosure 100 is designed to be mounted flush and tight against wall 150, with a flange 115 of the enclosure flushly facing the wall surface.

Figure 2:
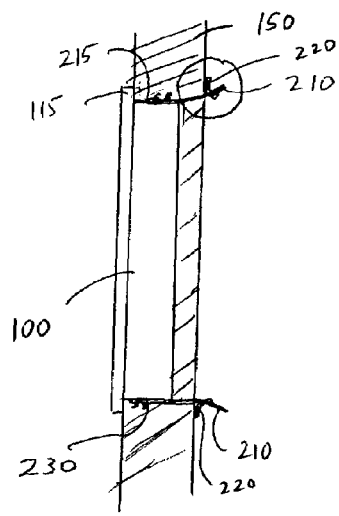
FIG. 2 shows a side view of the enclosure of FIG. 1.

FIG. 2 shows a cross-section side view of enclosure 100 mounted to wall 150. Generally, enclosure 100 is mounted to the wall using one or more straps 210 coupled to or engaged to an outer surface 215 of enclosure 100. For example, strap 210 can be coupled to a bracket 230, that is mounted to an outer surface of the enclosure. This example shows a strap 210 on the bottom and a strap 210 on the top of the enclosure. Other embodiments utilize the side surfaces as well as or instead of the top and bottom surfaces. A holder 220 mounted to back of wall 150 engages strap 210. As will be discussed below, as holder 220 is fastened to the wall, the holder pulls strap 210 towards the wall (e.g. towards the right in FIG. 2) such that the enclosure is pulled tight against wall 150 such that flange 115 is flush and tight with the wall.

Figure 3A:
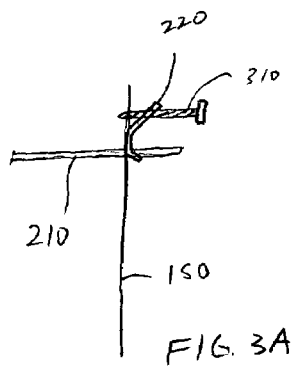
FIG. 3A shows a side view of a holder for mounting an enclosure, in accordance with one embodiment.
Figure 3B:
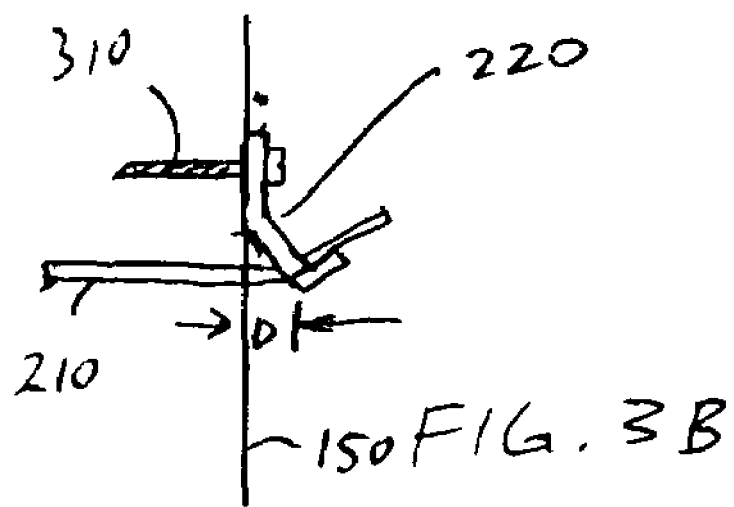
FIG. 3B shows a side view of the holder of FIG. 3A.

FIGS. 3A and 3B show a side view of holder 220 and strap 210 as the holder is mounted to wall 150. The strap 210 (after being coupled to the enclosure) is placed over the holder 220 and the holder is tightened into the wall using a fastener 310, such as a screw. As the holder 220 is tightened, it rotates and pulls the strap 210 a distance D, and since the strap is coupled to the enclosure, the enclosure is thereby pulled snug against the front of the wall.

Figure 4:
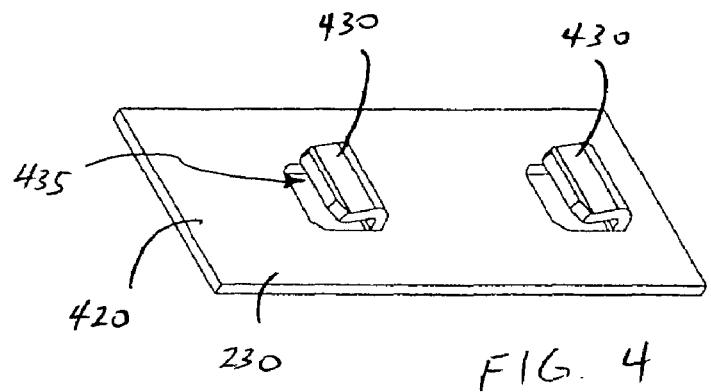
FIG. 4 shows a bracket, in accordance with one embodiment.

FIG. 4 shows enclosure bracket 230, in accordance with one embodiment. Enclosure bracket 230 includes a flat back wall 420 and one or more engagement hooks 430. This example includes two engagement hooks 430, but fewer than two or more than two can be used. Enclosure bracket is welded or otherwise fastened to an enclosure with hooks 430 oriented such that the open end 435 of the hooks is facing towards the front of the enclosure. As will, be discussed below, one or more holes in strap 210 (FIG. 2) can be placed over and engage to hooks 430. In some embodiments, enclosure bracket 230 can be omitted and the strap is mounted directly to the enclosure, for example, by welding. In other embodiments, hooks, such as hooks 430, can be integral members of the enclosure and formed on one or more surfaces of the enclosure as the enclosure is made.

Figure 5:
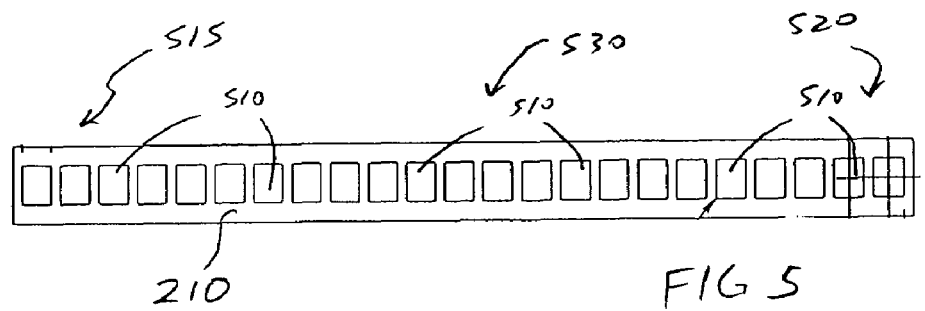
FIG. 5 shows a strap, in accordance with one embodiment.

FIG. 5 shows strap 210, in accordance with one embodiment. In one embodiment, strap 210 is an elongated, flat metal strap having a plurality of spaced holes 510. For example, strap 210 can be about one inch wide and about 11.6 inches long, with holes 510 spaced about ½" apart from each other. In other examples strap 210 can be made of plastic or other material. Holes 510 engage with hooks on the enclosure and with the holder 220 (FIG. 2). The installer places the strap onto a hook of the enclosure using a hole 510 proximate a first end 515 and then placing a hole 510 of a second end 520 (or anywhere along the strap, depending on the thickness of the wall) onto holder 220. By providing a plurality of engaging holes 510, the strap can be used on walls of differing thickness. For example holes in a middle section 530 of the strap can be used for thin wall and holes near the end 520 of the strap can be used for thicker wall. In some examples, strap 210 can be mounted to the enclosure in different manners. For example the strap can be welded directly to the enclosure or the strap can be fastened to the enclosure using bolts or other fastening means.

Figure 6:
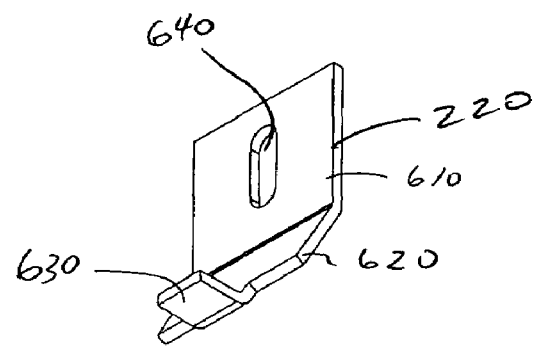
FIG. 6 shows a perspective view of the holder of FIGS. 3A and 3B.
Figure 7:
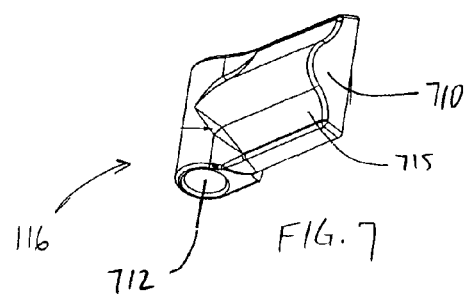
FIG. 7 shows a perspective view of a door hinge for an enclosure, in accordance with one embodiment.
Figure 8:
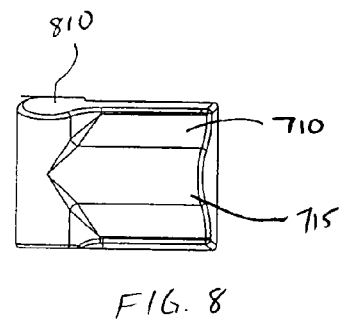
FIG. 8 shows a front view of the door hinge of FIG. 7.
Figure 9:
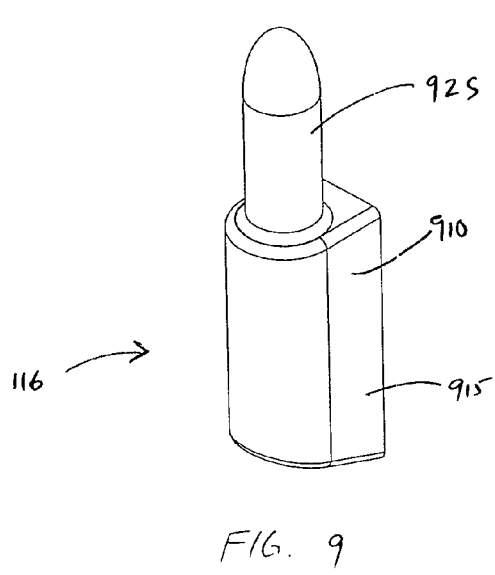
FIG. 9 shows a perspective view of a hinge body for an enclosure, in accordance with one embodiment.
Figure 10:
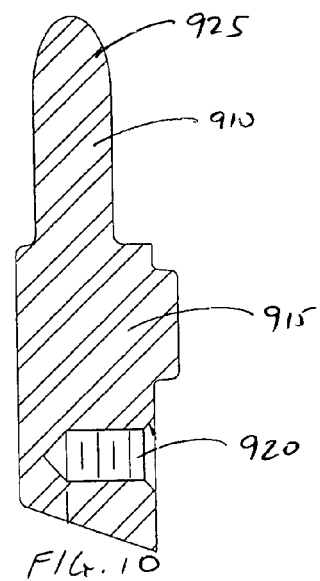
FIG. 10 shows a side, cross section view of the hinge body of FIG. 9.

FIG. 6 show a perspective view of holder 220, in accordance with one embodiment. Holder 220 generally includes a first wall 610, a second wall 620, and a tab 630. First wall 610 and second wall 620 have an angle therebetween. In this example, the angle is about 150 degrees. Other embodiments can use different angles, for example anywhere between about 90 degrees to about 180 degrees. Holder 220 is made of metal so that it does not bend too much when it is being fastened to the wall. Tab 630 extends from second wall 620. Tab 630 can be angled relative to second wall 620 so as to better engage strap 210 (FIG. 5). Tab 630 is dimensioned to allow holes 510 of strap 210 to fit over the tab. First wall 610 includes an elongate slot 640. Slot 640 allows the fastener to engage the wall in a generally straight manner when the holder is being fastened and as the holder rotates during the fastening, the slot rides along the fastener.

Referring again to FIGS. 2-6, the enclosure mounting system is used by placing an enclosure 100 against a wall 150. A strap 210 is engaged to the enclosure, for example, using hooks on enclosure brackets 230. The strap 210 is then coupled to holder 220, with holder 220 oriented such that its mounting wall 610 is tilted away from the wall surface and wall 620 and tab 630 are relatively closer to the wall. As a fastener 310 fastens holder 220 to the wall, the holder rotates such that wall 620 and tab 630 move away from the wall and holder wall 610 moves towards the wall, thereby pulling strap and enclosure 100 taut against the wall.

FIG. 1 showed hinges 116, 118. FIGS. 7-10 show further details of the hinges, in accordance with one embodiment. Hinge 116 includes a door mounted hinge portion 710 which includes a cylinder 712 to receive the enclosure body mounted hinge portion 910. Hinge portion 710 further includes a flange 715 to engage to the enclosure door. Flange 715 includes a tapped, threaded hole in the back side (not shown) to mount to the door of the enclosure. A top surface 810 of hinge portion 710 is angled to better allow the enclosure to be washed down without the hinge collecting foreign matter. Hinge portion 910 includes a main body 915 to be mounted to the enclosure using a tapped hole 920. An upper post 925 engages within cylinder 712 to allow the door to swing open and closed utilizing the hinge.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An apparatus comprising:
   an electrical enclosure mountable to a wall of a building, the electrical enclosure including a housing having a door;
   a strap having a first end and a second end, the first end coupled to an outer surface of the electrical enclosure; and
   a holder mounted to the wall, wherein the holder pulls the second end of the strap toward the wall to hold the electrical enclosure against the wall,
   wherein the holder includes an angled body.

2. An apparatus comprising:
   an electrical enclosure mountable to a wall of a building, the electrical enclosure including a housing having a door;
   a strap having a first end and a second end, the first end coupled to an outer surface of the electrical enclosure; and
   a holder mounted to the wall, wherein the holder pulls the second end of the strap toward the wall to hold the electrical enclosure against the wall,
   wherein the holder includes a first holder wall and a second holder wall, with the first holder wall angled relative to the second holder wall such that the holder rotates as the holder is fastened to the wall such that the second holder wall moves away from the enclosure so as to pull the strap.

3. An apparatus comprising:
   an electrical enclosure configured to be mounted to a wall of a building;
   a bracket mounted to the electrical enclosure, the bracket including a hook;
   a strap having a plurality of holes, the strap having a first end coupled to the bracket with the hook coupled to one of the plurality of holes; and
   a holder mounted to a back surface of the wall, wherein the holder includes a tab to couple to one of the plurality of holes of the strap such that the holder pulls the strap toward a front surface of the wall to hold the electrical enclosure against the front surface of the wall.

4. The apparatus of claim 3, wherein the strap includes an elongate body.

5. The apparatus of claim 3, wherein the strap includes a metal strap.

6. The apparatus of claim 3, wherein the holder includes an angled body.

7. The apparatus of claim 3, wherein the holder includes a first holder wall and a second holder wall, with the first holder wall angled relative to the second holder wall such that the holder wall rotates as the holder is fastened to the wall such that the second holder wall moves away from the enclosure so as to pull the strap.

8. An apparatus comprising:
   an electrical enclosure mountable to a front side of a wall of a building, the electrical enclosure including a front side, a back side, a top side, and a bottom side, the front side including a hinged door attached thereto;
   a strap including a first end coupled to an outer surface of the electrical enclosure; and
   a holder mounted to a back side of the wall, the holder configured to be attached to the strap,
      wherein the holder pulls the strap through the wall to hold the electrical enclosure against the wall,
      the holder including a first holder wall and a second holder wall,
   with the first holder wall angled relative to the second holder wall such that the holder pivots as the holder is fastened to the wall such that the first holder wall moves toward the back side of the wall and the second holder wall moves away from the back side of the wall so as to pull the strap and anchor the electrical enclosure tightly to the wall.

* * * * *